United States Patent

[11] 3,593,693

| [72] | Inventor | Dietrich Seelmann-Eggebert Wolfsburg, Germany |
|---|---|---|
| [21] | Appl. No. | 784,347 |
| [22] | Filed | Dec. 17, 1968 |
| [45] | Patented | July 20, 1971 |
| [73] | Assignee | Volkswagenwerk Aktiengesellschaft Wolfsburg, Germany |
| [32] | Priority | Dec. 23, 1967 |
| [33] | | Germany |
| [31] | | P 15 76 693.5 |

[54] SPARK TIMING CONTROL FOR VEHICLE ENGINES
2 Claims, 3 Drawing Figs.

[52] U.S. Cl. .................................................. 123/117, 123/102
[51] Int. Cl. ...................................................... F02p 5/04, F02d 11/10
[50] Field of Search ............................................ 123/117, 102

[56] References Cited
UNITED STATES PATENTS

| 1,663,207 | 3/1938 | Mallory | 123/117 |
| 1,759,425 | 5/1930 | Suekoff | 123/117 |
| 1,861,417 | 5/1932 | Klaiber | 123/117 |
| 1,882,720 | 10/1932 | Arthur | 123/117 |
| 1,886,566 | 11/1932 | Mallory | 123/117 |
| 2,712,814 | 7/1955 | Harr | 123/117 X |
| 3,252,451 | 5/1966 | Sarto | 123/117 |

*Primary Examiner*—Wendell E. Burns
*Attorney*—Watson, Cole, Grindle and Watson

ABSTRACT: Ignition distributor spark timing control having a common control disc mounting, a retarded spark interrupter connected in series with two series-connected switches, respectively operated by throttle valve position and engine speed, and an advanced spark second interrupter shunted across the first-mentioned interrupter and the two switches.

PATENTED JUL20 1971   3,593,693

*INVENTOR.*
D. Seelmann-Eggebert

BY
Watson Cole Grindle & Watson
Attys.

SPARK TIMING CONTROL FOR VEHICLE ENGINES

The invention relates to a spark timing control for vehicle engines to tend to reduce the emission of poisonous exhaust gases without adversely affecting the performance of the engine.

The invention comprises an ignition distributor which, using a switching arrangement, is charged from one of two basic timing settings to the other, in dependence on the position of the throttle valve. When the throttle valve is closed the distributor is set to the basic setting "retarded spark" and when open to "advanced sprark." When changing from idling to acceleration and finally to cruising speed, the spark timing setting is thus moved from "retarded" to "advanced." When the vehicle coasts (closed throttle valve), the timing is changed back to "retarded." As a consequence, whether the engine is idling or the vehicle is being pushed or coasts, there is good combustion and the emission of harmful components in the exhaust is reduced.

The purpose of the invention is to produce a spark timing control system that results in a further reduction of the harmful exhaust gases, so that when quickly descending a mountain, or when the throttle valve is closed but the engine speed is high (fast pushing), the exhaust contains only a small percentage of gases injurious to health.

An object of this invention is a spark timing control that is operable in dependence on the engine speed, as well as in dependence on the position of the throttle valve.

The invention thus ensures the ignition to be set to "advanced spark" when the throttle valve is closed at relatively high engine speeds, thereby obtaining better combustion, and to "retarded spark" only when the engine speed falls below a predetermined value.

Further aspects, advantages, and objects of the invention will be apparent from the following detailed description of several embodiments when considered in connection with the accompanying drawing in which.

Figure 1:
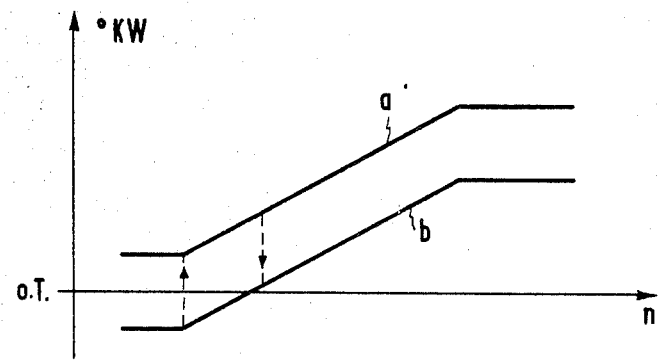
FIG. 1 is a diagram in which two spark timing curves are plotted against engine r.p.m.
Figure 2:
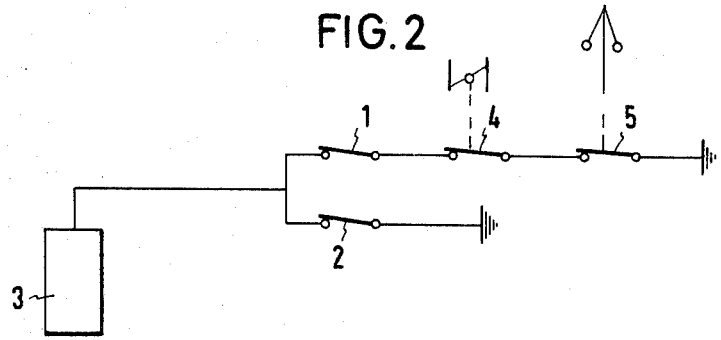
FIG. 2 is a circuit diagram of a first embodiment of the invention.

With reference to the diagram of FIG. 1, two spark timing curves $a$ and $b$ are plotted against engine r.p.m. $n$, the curve $a$ corresponding to an advanced spark basic setting of 10° crankshaft angle (°KW) before upper dead center, and the curve $b$, to a retarded spark basic setting of 10° crankshaft angle after upper dead center. The abbreviation o.T. on FIG. 1, means "upper dead center." The two spark interrupters 1 and 2, respectively corresponding to these two basic settings of the ignition distributor, are shown in the circuit diagram of FIG. 2.

Ignition through the interrupter 1 which is set to the basic setting, "retarded spark" can occur only when a switch 4, operated in dependence on the position of the throttle valve, and a switch 5, operated in dependence on the engine speed, both connected in series with the interrupter 1, are closed. When the switches 4 and 5 are closed, the fact that the interrupter 2 is open has no effect, since the interrupter 1 and the switches 4 and 5 provide a path to ground from an ignition coil 3. When the interrupter 1 opens, the earlier opening interrupter 2 is still open.

When idling with a closed throttle valve and low engine speed, both switches 4 and 5 are closed. The ignition system is set to retarded spark, curve $b$, FIG. 1. As the throttle valve begins to open, the switch 4 first of all opens and then the spark timing abruptly changes to advanced spark, curve $a$, FIG. 1. The subsequent opening of the switch 5, caused by rising engine speed has no effect. At full load the spark timing varies in accordance with curve $a$. When the vehicle is pushed, or coasts, the switch 4 is closed because the throttle valve is closed; but the timing is not changed to retarded spark, curve $b$, until the engine speed has fallen to a predetermined value. The advantage of the invention as against the previously suggested circuits and arrangements, is that the timing is switched from curve $a$ to curve $b$ at a later moment, and thereby the emission of harmful components of the exhaust is further reduced.

Figure 3:
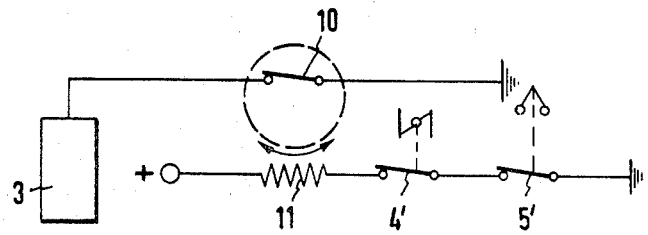
FIG. 3 is a circuit diagram of a second embodiment of the invention.

In a modification of the invention shown in FIG. 3, the second interrupter is eliminated, and a control disc having a spark interrupter 10 is in addition to its normal setting, set at retarded spark by an electromagnet 11, for example by the current path of the closed switches 4' and 5', these two switches respectively corresponding to the switches 4 and 5 in the circuit of FIG. 1, except when the control disc is moved by the energized electromagnet 11 to the retarded spark setting, the disc which might be spring loaded, remains in its advanced spark position.

Although the preferred embodiments of the invention have been described; the scope of and the breadth of protection afforded to the invention, are limited solely by the appended claims.

I claim:

1. An ignition distributor spark timing control for a vehicle internal combustion engine having a throttle valve for controlling its speed, comprising a first switch (4) operated in dependence on the position of the throttle valve to be closed and opened respectively with the throttle valve; a second switch (5) connected in series with said operated in dependence on the engine speed to be closed at idling speed of the engine and to open when the speed of the engine increases above idling, said second switch being connected in series with the said first switch; a first spark interrupter first and second switches and having a retarded setting; and a second spark interrupter (2) having an advanced setting and connected in parallel with said first and second switches and said first interrupter.

2. An ignition distributor spark timing control as defined in claim 1, including an ignition coil connected in series with said first and second switches and said first spark interrupter, and with said second spark interrupter.